Aug. 7, 1923.
G. BAUMANN ET AL
1,463,784
ROTARY INTERNAL COMBUSTION ENGINE
Filed March 16, 1921     3 Sheets-Sheet 1
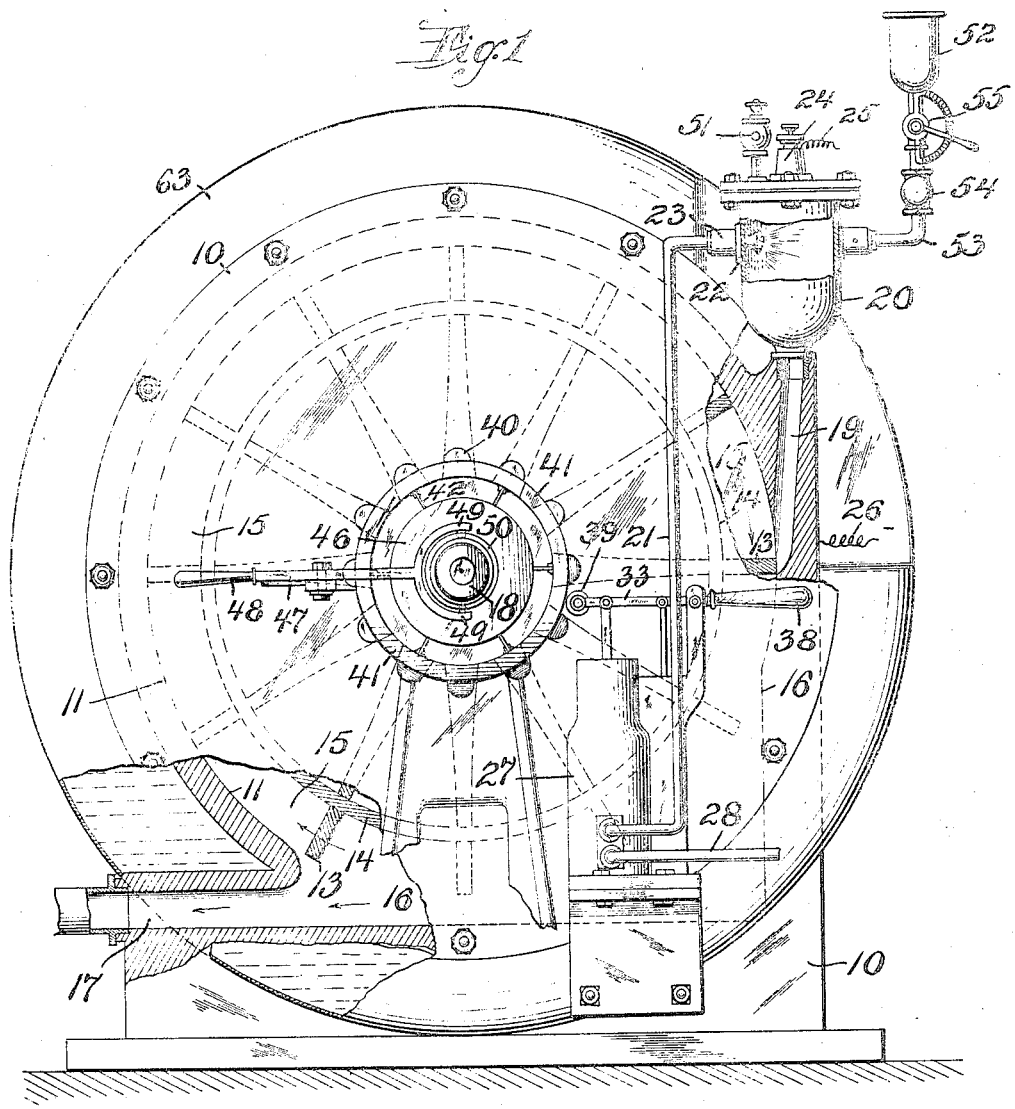
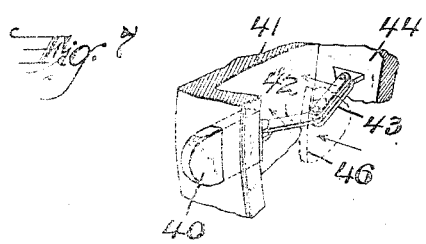
INVENTORS
Gustav Baumann
and Joseph Hopta
BY
Wm H Canfield
ATTORNEY

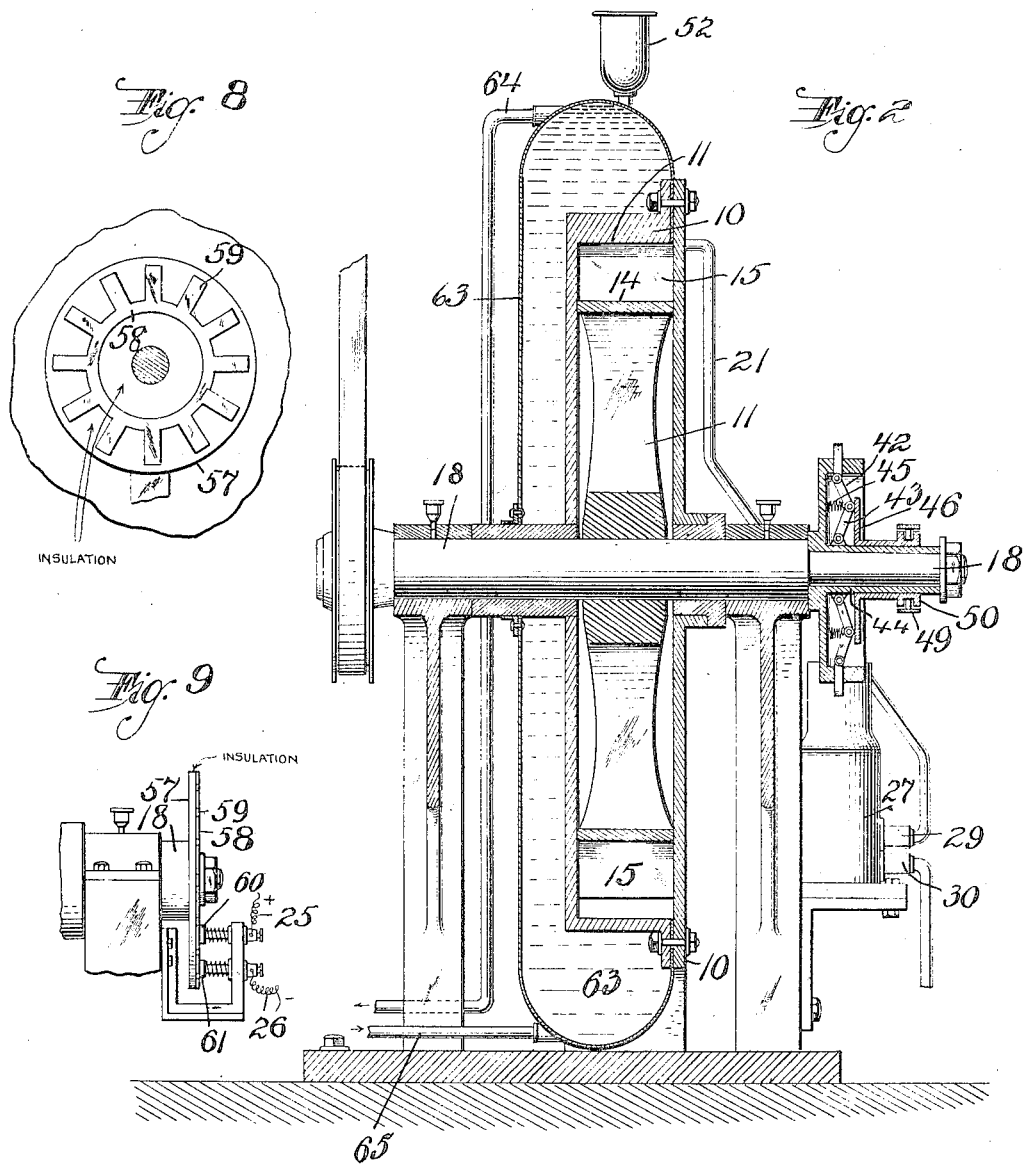

Aug. 7, 1923.
G. BAUMANN ET AL
ROTARY INTERNAL COMBUSTION ENGINE
Filed March 16, 1921   3 Sheets-Sheet 3
1,463,784
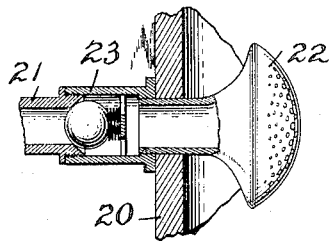
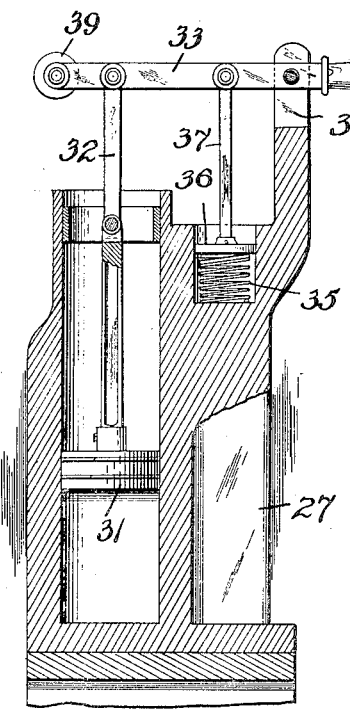
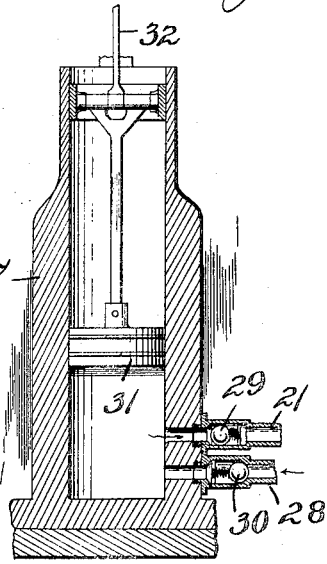
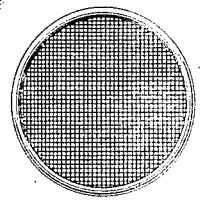
INVENTORS
Gustav Baumann,
and Joseph Hopta
BY
Wm. H. Caufield
ATTORNEY Patented Aug. 7, 1923.

1,463,784

UNITED STATES PATENT OFFICE.

GUSTAV BAUMANN, OF RAHWAY, AND JOSEPH HOPTA, OF AVENEL, NEW JERSEY.

ROTARY INTERNAL-COMBUSTION ENGINE.

Application filed March 16, 1921. Serial No. 452,748.

*To all whom it may concern:*

Be it known that we, GUSTAV BAUMANN and JOSEPH HOPTA, citizens of Germany and the United States, respectively, and residents of Rahway, county of Union, and State of New Jersey, and Avenel, county of Union, and State of New Jersey, respectively, have invented certain new and useful Improvements in Rotary Internal-Combustion Engines, of which the following is a specification.

This invention relates to an improved internal combustion engine of the rotary type, which is extremely simple in its design and operation and economical in the use of fuel.

The invention is designed to provide an engine which can be easily started on account of the absence of pressure to be overcome, one which is light in weight in comparison with its power, and one which can be used with light or heavy oils as fuel.

The invention is illustrated in the accompanying drawings, in which Figure 1 is a side view of the engine partly broken away to show the interior construction. Figure 2 is a central vertical section of the same. Figures 3 and 4 are sections of the pump for injecting fuel oil. Figure 5 is a section of the fuel inlet of the explosion chamber. Figure 6 is a top view of a filler af the air inlet. Figure 7 is a perspective view of part of the tappet mechanism. Figure 8 is a face view, and Figure 9 a side view of the ignition timing device.

The engine casing 10 is provided with an annular chamber 11, in which is mounted the rotor 12, which rotor has arms 13, usually arranged radially thereon and connected by an annular plate 14, so that they form, with the inner face of the chamber, a series of pressure chambers 15. The inside of the casing is enlarged, as at 16, to provide a passage for exploded and released gases to the outlet or exhaust port 17. A shaft 18 passes through the casing and supports and is driven by the rotor 11.

The casing is provided with an inlet port 19 which is arranged tangential to the rotor and enters the chamber 11 near the enlarged part 16 of the chamber 11, so that a pressure chamber 15 that receives the impact of exploded mixture from the inlet port 19 does not open into this enlarged part until the rear end of the chamber has been shut off from the inlet port 19.

On the top of the inlet port is mounted a casing 20 which forms an explosion chamber which receives the fuel from a pipe 21, which fuel pipe has its inlet end provided with a rosehead 22, as will be seen from Figure 5, which is filled with fine perforations so as to spray the oil into the explosion chamber, and which is provided with a check valve 23 closely adjacent to the explosion chamber 20, so that on a cessation of pumping or injecting, the oil pipe is shut off from the explosion chamber, and similarly is at once closed on an explosion in said chamber.

The top of the chamber is provided with suitable ignition means, such as a spark plug 24 which projects a spark at the proper time through and by means of the timing mechanism, which will be hereinafter described and from which the current is received through the wires 25 and 26, Figure 1.

The fuel inlet pipe 28 is connected with a pump 27 which receives the oil from a suitable source of supply through the pipe 28, and the cylinder of the pump, as will be seen from Figures 3 and 4, is connected to the two pipes 21 and 28, the pipe 21 having a normally inwardly operating check valve 29, and the pipe 28 having an outwardly operating check valve 30. The piston 31 of the pump is operated by means of the piston rod 32 which is connected to a lever 33 pivoted on the support 34 and yieldingly held up by the spring 35 bearing on the plate 36 connected by the lever 37 with the lever 33. The handle 38 on the lever 33 provides for its manual operation, and an anti-friction device, such as a roller 39, is installed so as to receive the impact of the tappets 40 which are arranged on a ring 41, which is mounted on the shaft 18, one tappet being provided for each explosion chamber.

For ease in starting we prefer to arrange the holder 41 that carries the tappets 40 so that selected tappets can be withdrawn when desired, in the form shown these selected tappets being connected by toggles 42 and 43 with the hub 44 of the holder 41, the springs 45 normally having a tendency to force these toggles so that they withdraw these tappets, for instance every other one, inwardly, so that these inwardly drawn tappets will not contact with the end of the arm 33 to actuate the pump.

A disk 46 is actuated by means of the lever 47 and the handle 48, since the inner end 49 is forked and has pins in its ends fitting into the groove of the forked collar 50, The withdrawal of these tappets is desirable for ease in starting or for reduction in the speed of the engine, since only every other pressure chamber will receive an explosive mixture.

A safety valve 51 is mounted on the explosion chamber and an air inlet 52 is arranged so as to receive air and conduct it to the explosion chamber through the pipe 53, this air inlet pipe having a check valve 54 and a manually operated valve 55 for regulating the amount of air admitted. The top of the chamber is preferably provided with a screen, such as shown at 56 in Figure 6.

If a spark plug is employed for ignition it is actuated by a timing mechanism, one type of which is shown in Figures 8 and 9, in which a disk 57 of insulation is provided with a contact 58 and arms 59 projecting therefrom and two stationary contacts 60 and 61 to circuit with the wires 25 and 26, which are part of an ignition circuit, to time the sparking, so that on the injection of oil and the suction of air into the explosion chamber the mixture will be exploded.

When the engine is to be started, in order to make it easier the handle 48 is swung so as to slide the disk 46 backward and permit the selected tappets, in the drawings every other one being indicated, to withdraw, and then the shaft 18 is rotated by suitable means, such as a hand wheel, or, if desired, the pulley 62 can be used, and a tappet hitting the lever 33 forces the pump to inject through the pipe 21 a spray of oil which, when mixed with air, is explosive, the rotation of the rotor at the same time drawing in air through the air inlet pipe 53.

When the rotation arrives at a point where the ignition timing device causes the spark plug 24 to produce a spark, the explosion in the explosion chamber occurs and the explosive mixture is forced through the inlet port 19 and against the forward wall of one of the pressure chambers 15, and from then on it will be evident that the rotation of the engine is continuous.

When the speed is to be increased the handle 48 is swung to force the disk 46 so that it pushes in the toggle levers 42 and 43 and all the tappets 40 are projected into operative position, as shown in Figure 1. We may use heavy or light oils in this engine, and, if desired, instead of a spark plug a suitable coil or strip of high resistance wire is placed preferably on the inside face of the top of the explosion chamber 20, which ignites the oil projected therein, and in this case the timing device shown in Figures 8 and 9 can be omitted.

A suitable water-cooled jacket 63 is provided around the casing 10, preferably around the periphery and the back, and pipes 64 and 65 are used to conduct water to and from this cooling chamber, as will be evident.

We claim:

1. A rotary internal combustion engine comprising a casing, a rotor in the casing, an explosion chamber with a passage to direct exploded mixture to the rotor, a shaft on which the rotor is mounted, a pump for injecting fuel into the explosion chamber, a disk with tappets for actuating the pump, and means for withdrawing selected tappets from the actuating positions.

2. A rotary internal combustion engine comprising a casing, a rotor in the casing, an explosion chamber with a passage to direct exploded mixture to the rotor, a shaft on which the rotor is mounted, a pump for injecting fuel into the explosion chamber, a disk with tappets sliding therein, a piston in the pump, which piston has a rod in the line of rotation of the tappets, and means for moving selected tappets radially so that they can be withdrawn so as to reduce the frequency of explosion of the motor.

3. A rotary internal combustion engine comprising a casing, a rotor in the casing, an explosion chamber with a passage to direct exploded mixture to the rotor, a shaft on which the rotor is mounted, a pump for injecting fuel into the explosion chamber, a disk with tappets sliding therein, a piston in the pump, which piston has a rod in the line of rotation of the tappets, means for moving selected tappets radially so that they can be withdrawn so as to reduce the frequency of explosion of the motor, and means for manually operating the pump independent of the tappets.

In testimony that we claim the foregoing, we have hereto set our hands, this 15th day of March, 1921.

GUSTAV BAUMANN.
JOSEPH HOPTA.